United States Patent
Culpepper et al.

(10) Patent No.: US 6,193,430 B1
(45) Date of Patent: Feb. 27, 2001

(54) QUASI-KINEMATIC COUPLING AND METHOD FOR USE IN ASSEMBLING AND LOCATING MECHANICAL COMPONENTS AND THE LIKE

(75) Inventors: Martin Culpepper, Winthrop, MA (US); Alexander H. Slocum, Bow, NH (US)

(73) Assignee: AESOP, Inc., Concord, NH (US)

( * ) Notice: Subject to any disclaimer, the term of this patent is extended or adjusted under 35 U.S.C. 154(b) by 0 days.

(21) Appl. No.: 09/272,239

(22) Filed: Mar. 18, 1999

(51) Int. Cl.[7] ................................. F16B 1/00; F16B 1/02
(52) U.S. Cl. ................................. 403/13; 403/14; 403/11; 403/334; 403/361
(58) Field of Search .................. 403/13, 14, 11, 403/333, 334, 361; 425/195, 193, 205, 249, 468

(56) References Cited

U.S. PATENT DOCUMENTS

| | | | |
|---|---|---|---|
| 849,514 | * | 4/1907 | Tabor et al. ....................... 248/176.3 |
| 3,203,082 | * | 8/1965 | Robbins ................................. 403/13 |
| 3,235,205 | * | 2/1966 | Luketa .................................. 403/335 |
| 4,070,120 | * | 1/1978 | Bald et al. ............................. 403/13 |
| 4,199,313 | * | 4/1980 | Bohnenberger ....................... 425/408 |
| 4,252,295 | * | 2/1981 | Wilson, Jr. ............................. 249/205 |
| 5,678,944 | * | 10/1997 | Slocum et al. ......................... 403/13 |
| 5,711,647 | * | 1/1998 | Slocum ................................. 414/749 |
| 5,733,024 | * | 3/1998 | Slocum et al. ..................... 312/223.2 |
| 5,769,554 | * | 6/1998 | Slocum ................................. 403/13 |
| 5,821,764 | * | 10/1998 | Slocum et al. ........................ 324/758 |
| 6,010,008 | * | 1/2000 | Nyseth et al. ......................... 206/711 |

* cited by examiner

Primary Examiner—Lynne H. Browne
Assistant Examiner—Ernesto Garcia
(74) Attorney, Agent, or Firm—Rines and Rines

(57) ABSTRACT

A quasi-kinematic coupling for mating components (mechanical parts, surfaces, assemblies and the like) employing mating sets of surface of revolution, (conical) grooves and cooperative surface of revolution (spherical/conical) protrusions for establishing six lines (not just prior points) of contact at the kinematic interfaces, and with elastic compliance therebetween and preferably with relief features to define the effective orientation as a clamping force seats the protrusions in the grooves and seals the component mating surfaces into contact.

16 Claims, 3 Drawing Sheets

QUASI-KINEMATIC COUPLING AND METHOD FOR USE IN ASSEMBLING AND LOCATING MECHANICAL COMPONENTS AND THE LIKE

TECHNICAL FIELD

The present invention relates to the coupling of mechanical component parts, surfaces or assemblies and the like (hereinafter sometimes generically termed "components"), where low cost and repeatable coupling are desired, as, for example, in applications and processes involving machine tool fixtures and other general assembly applications.

BACKGROUND

Better precision at lower cost is a major driving force in design and manufacturing. Traditionally, precision assemblies have used precision pins and holes for part alignments; but the demands of manufacturing processes have now pushed performance requirements beyond the approximately ten micron repeatability limits of such techniques. Next generation assemblies, such as, for example, machining fixtures, require low cost methods of assembly with consistently better than ten microns repeatability. The present invention is accordingly directed to a fundamentally new kinematic coupling, termed here a "quasi-kinematic" coupling, which meets the more stringent demands of these processes.

While certain types of prior kinematic couplings have been used to provide affordable submicron repeatability, their operation generally leaves gaps between the mated components, and they are therefore not well-suited for those types of precision assembly applications that require contact or sealing, such as in casting. This problem has been addressed in part by compliant kinematic couplings as described in U.S. Pat. No. 5,678,944, Flexural Mount Kinematic Coupling and Method, of common assignee Advanced Engineering Systems Operation and Products (AESOP) Inc. herewith. These types of couplings kinematically locate components and then allow translation parallel to the mating direction until contact is made between the desired surfaces. Though constituting a significant improvement, such couplings are not ideally suited for use in high volume manufacturing and assembly processes, due to the cost of manufacturing and assembling the flexural and kinematic components. Another limitation of these couplings resides in their inability to be arranged so that most of the resistance to error-causing loads is aligned in a common direction, while maintaining high stiffness in an orthogonal direction.

The present invention, on the other hand, as later more fully explained, overcomes such limitations by using conical shaped grooves with relieved sides which can direct a desired portion of their error resistance along a direction without seriously compromising the resistance to error in an orthogonal direction. Accomplishing this function in prior classical or flexural kinematic couplings is not achievable since their use of conventional straight V grooves leaves one degree of freedom and with very low stiffness.

In further U.S. Pat. No. 5,769,554, also of common assignee, an invention is described for use in sand casting and similar applications which incorporates kinematic elements into parts of the mold in a manner that admirably solves this problem, though only for low precision or sand mold assemblies and the like. The use of this coupling in large scale assembly and locating applications is, however, somewhat limited due to the fact that the kinematic elements must be pre-formed into the components. This technique, therefore, is not well suited for coupling situations requiring precision assemblies where machining of the mating surfaces is required, more specifically, in high precision assembly activities where the mating of the components is dependent upon the depth and size of the kinematic elements (i.e. grooves.) For such higher precision assemblies, this geometric relationship is sensitive enough that the capability of net shape manufacturing processes is insufficient to hold the relation between the kinematic features and the mating surface. While this problem may be addressed by machining the contact surfaces of the mated components, this would destroy the geometric relationship initially imparted to the components by the net shape process, nullifying the advantage of pre-formed elements.

In the absence of the ability to form, as, for example, by casting these kinematic features, they must be machined. Machining straight grooves into components requires translation motion in a minimum of two directions; depth perpendicular to the mating surface and translation in a direction contained in the plane defined by the contact surface. In comparison, the present invention, through using the principle of said patents, also introduces a novel way to form quasi-kinematic elements during a simple plunge operation using a rotating form tool, further providing a low cost method to manufacture these elements while simultaneously machining other features into the mated components.

OBJECTS OF THE INVENTION

An object of the present invention, accordingly, is to provide a new and improved low cost quasi-kinematic coupling and method which enable repeatably locating two or more components, surfaces, or assemblies or the like without any of the above-described or other limitations of prior couplings.

A further object is to provide such a novel coupling in which opposing surfaces of the components are allowed to come into intimate contact and form a sealable joint, and wherein repeatability is less sensitive to errors in the relative placement of the kinematic elements, and with the transverse stiffness of the coupling decoupled from the transverse quasi-kinematic coupling stiffness by relying on the resistance to motion due to friction between the surfaces of the mated components, and the stiffness of the coupling in the mated direction is decoupled from the quasi-kinematic coupling stiffness by relying on the resistance to motion due to a clamping force and the contact of the mated surfaces.

Another object of the invention is to provide a quasi-kinematic coupling in which the orientation of its kinematic elements can be set to provide maximum resistance to error-causing loads in a plane perpendicular to the mating direction, while maintaining resistance to motion in the same plane, but perpendicular (orthogonal) to the sensitive direction.

Other and further objects will be explained hereinafter and are more fully delineated in the appended claims.

SUMMARY

In summary, from one of its important aspects, the invention embraces a method of quasi-kinematic coupling of two matable components with repeatable location alignment of their mating surfaces, that comprises, providing the mating surfaces with correspondingly disposed respective sets of three grooves and corresponding mating protrusions, each of the grooves and protrusions being formed as surfaces of revolution, bringing the mating surfaces together to establish six lines of groove-protrusion contact, two lines at each mating groove and protrusion, and with a small gap maintained between the two components mating surfaces; and clamping by forcing the components together to seat the protrusions in the grooves and seal the gap to effect the coupling with the two component mating surfaces in contact.

This invention is a fundamentally new kinematic coupling for use in precision alignment of product components, tooling, and fixtures and the like which require a repeatable, low cost manufacturing and assembly process, and it incorporates conical grooves, sometimes with accompanying side reliefs, into one mated component and spherical members into the other component. These elements can either be machined directly into the mating components or attached to them. This is herein described as "quasi-kinematic" because the relative position of the mated components is defined by six lines of contact at the kinematic interfaces, as distinguished from six points of contact used in a true kinematic coupling. The line contact results from mating two surfaces of revolution, the conical groove and the spherical peg. A traditional kinematic coupling has six distinct points of contact, such as provided by three hemispheres making contact with three Vee-grooves. This allows the hemispheres to be restrained normal to the grooves, yet be free to move along the grooves, so in combination, the system is exactly constrained. If, however, the Vee grooves are actually curved to form cones, with relieved sides, as disclosed in the present application, then the hemispheres make contact with the curved surfaces, and the stiffness of the contact in a direction orthogonal or normal to the cone surface is very high—much higher than any restraint in a direction tangent to the contact normal. Hence, mathematically, in terms of dominant stiffness of the system, the system will behave as if kinematically coupled, and hence is termed herein as "quasi-kinematic".

The six lines of contact (two at each sphere-groove interface) act to define the six relative degrees of freedom between the mated components, such degrees of freedoms being the translation and rotational motions on a plane. This is a weakly over-constrained system that still effectively acts like a kinematic coupling. The interface is designed such that a small gap is left between the contacting surfaces in order to ensure the kinematic nature of the joint. A force is then applied to properly seat the spherical members in the grooves. Specific compliance characteristics can be designed into the kinematic elements, making it possible for them to deform under additional preload, even to the point where the opposed surrounding planar surfaces touch. When the clamping force is released, all or a fraction of the gap is restored through elastic or resilient recovery of the kinematic element material, thus ensuring that the next mate will still be quasi-kinematic.

The coupling is readily designed or incorporated into existing parts since the kinematic elements can be made by simple, low cost manufacturing processes. Its application is especially suited to applications which have traditionally heretofore used pinned joints, including many medium and large scale manufacturing processes such as casting, assembly, and fixturing.

Preferred and best mode design and operation methods are hereinafter detailed.

DRAWINGS

The aforementioned invention will now be described with reference to the accompanying drawing in which.

Figure 7:
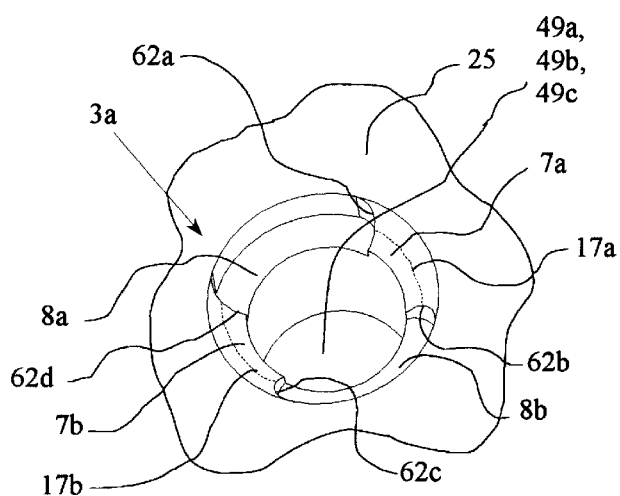
Figure 8:
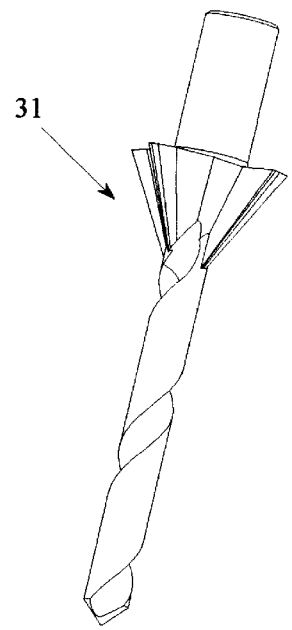
Figure 9:
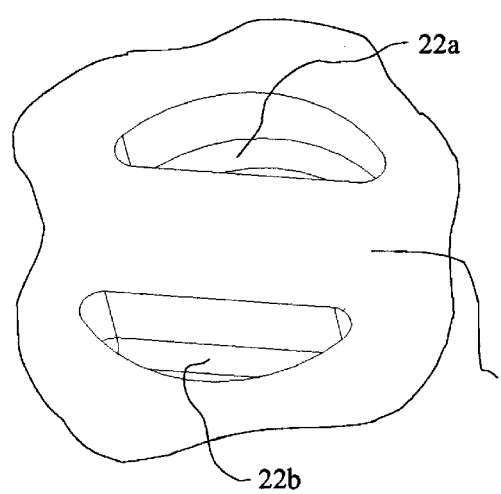
Figure 10:
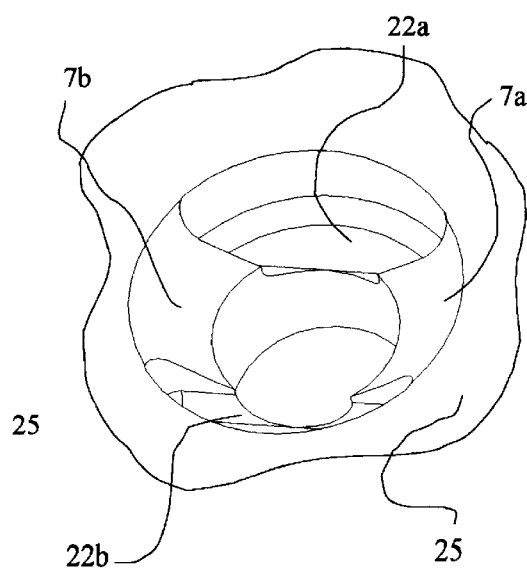

FIG. 7 details the contact lines in a quasi-kinematic coupling's conical groove;

FIG. 8 shows a tool which can simultaneously machine a conical groove and drill a hole;

FIG. 9 shows side reliefs of a conical groove cast in prior to the machining of the seats;

FIG. 10 shows a conical groove with cast in side reliefs after machining with a form tool;

PREFERRED EMBODIMENT(S) OF THE INVENTION

Figure 1:
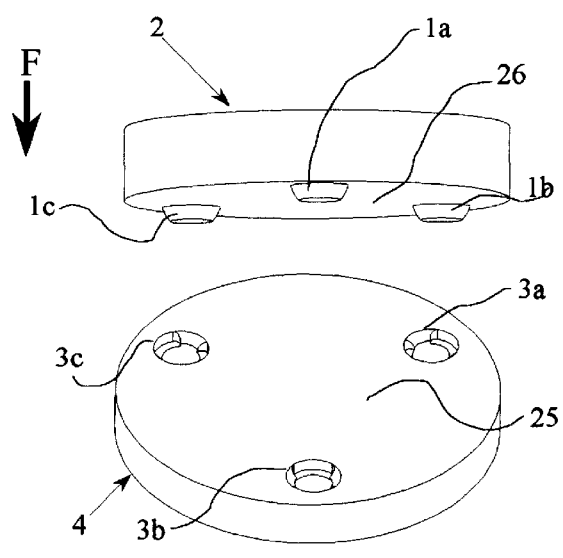
FIG. 1 is an illustration of a generic quasi-kinematic coupling constructed in accordance with a preferred embodiment of the invention.
Figure 2:
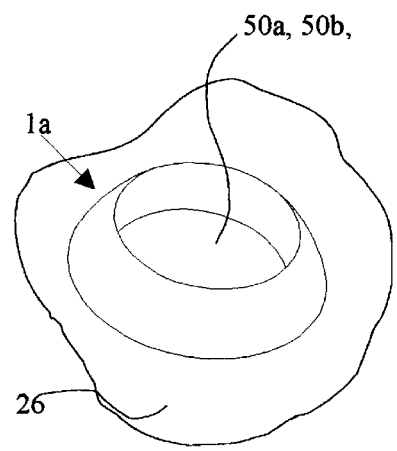
FIG. 2 is a detail of a generic quasi-kinematic spherical element.

FIG. 1 shows the open coupling 2-4 of the invention in its generic form. The coupling consists of three spaced conical grooves 3a, 3b, and 3c attached to or machined into the inner surface 25 of the first (lower) component 4, and three corresponding spherical peg or protruding elements 1a, 1b, and 1c attached or machined into the opposing or inner surface 26 of the second (upper) component 2, FIGS. 1 and 2. When such a coupling is initially mated, each spherical protrusion element 1a, 1b, and 1c contacts its corresponding conical groove 3a, 3b, and 3c, and surfaces 25 and 26 will be parallel and separated by a small gap.

Figure 4:
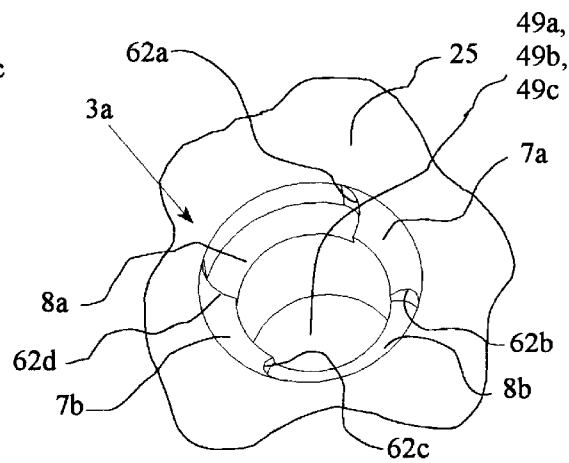
FIG. 4 is a detail of a generic quasi-kinematic conical groove.

This contact takes place on seats of the conical grooves, as shown at 7a and 7b for the illustrative groove 3a, in FIG. 4 and FIG. 7. The contact can be modeled as along lines 17a and 17b, FIG. 7, since the surfaces of the spherical elements 1a, 1b, and 1c and the surfaces of the conical grooves 3a, 3b, and 3c are surfaces of revolution. With each conical groove 3a, 3b, and 3c having reliefs 8a and 8b at the appropriate location, the contact areas can be made to resemble those of a kinematic coupling.

Figure 5:
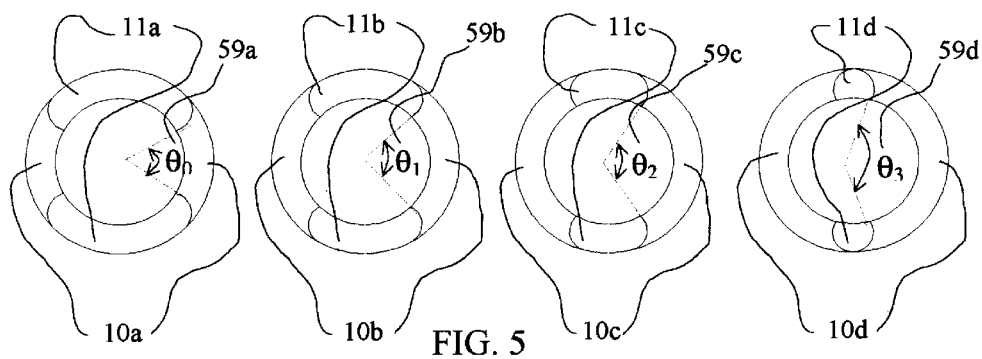
FIG. 5 is a two-dimensional view of several quasi-kinematic grooves with different contact angles.

FIG. 5 shows four views of conical grooves with varying contact angles ($\Phi_0$, $\Phi_1$, $\Phi_2$, $\Phi_3$,) at 59a, 59b, 59c, and 59d, respectively. As the contact angle of the seats 10a, 10b, 10c, and 10d increases, as by decreasing relief zones 11a, 11b, 11c, and 11d, respectively, the coupling becomes more like a deterministic kinematic coupling. The benefit of reducing the contact angle 59 is limited by the contact stress, which increases with decreasing contact angle $\Phi$.

The resulting contact defines a near kinematic or "quasi-kinematic" definition previously described of six degrees of freedom between the first component 2 and second component 4, as before described. Practically, due to manufacturing errors, only a portion of the seats 7a and 7b in a joint will contact the surface of the spherical member, such as the member 1a shown in FIG. 3. This situation, in addition to friction forces at the sphere-groove contact interface, can prevent the first component 2 from settling into its most stable equilibrium. This can further be prevented with a preload force (schematically shown as F in FIG. 1) that is ideally parallel to the mating direction and large enough to overcome the contact friction and properly seat the spherical member 1a in its groove 3a. Once the preload is applied, the coupling defines a repeatable mate. In addition, if the mating of the opposed faces 25 and 26 of components 4 and 2 respectively, is desired, compliance characteristics (elastic and plastic) can be designed into the kinematic elements 1a, 1b, 1c, 3a, 3b, and 3c so that additional preload force causes them resiliently to deform and allow the opposing surfaces 25 and 26 to contact, thereby forming a sealable joint.

Figure 6:
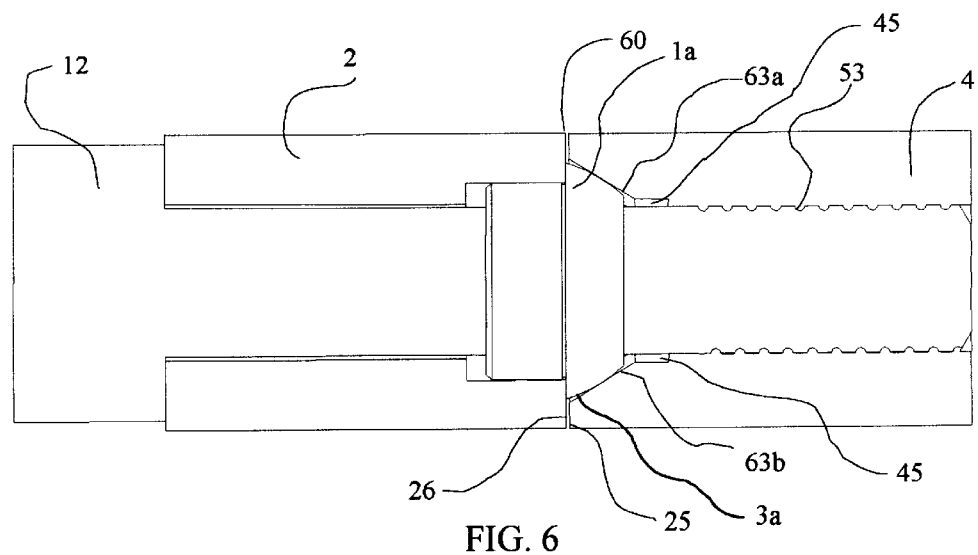
FIG. 6 is a cross section of a generic quasi-kinematic joint clamped together by a bolt.

Depending upon several factors, including the manufacturing capability of the machines used to make and locate the kinematic elements 1a, 1b, 1c, 3a, 3b, and 3c, shown generically in FIG. 1, the size of the mated gap 60 seen in the cross section in FIG. 6, will vary. Ideally, the gap variation will be such that mating of the opposed surfaces 25 and 26 will require only elastic deformation of the kinematic elements 1a, 1b, 1c, 3a, 3b, and 3c. However, when the manufacturing process is not capable of holding the required tolerances, plastic deformation of the kinematic elements 1a, 1b, 1c, 3a, 3b, and 3c may occur. In either case, after the initial mate, the material in the kinematic elements 1a, 1b, 1c, 3a, 3b, and 3c will recover elastically, restoring a portion of the initial gap 60. This is necessary to maintain the quasi-kinematic nature of the joint for future mating sequences.

Figure 3:
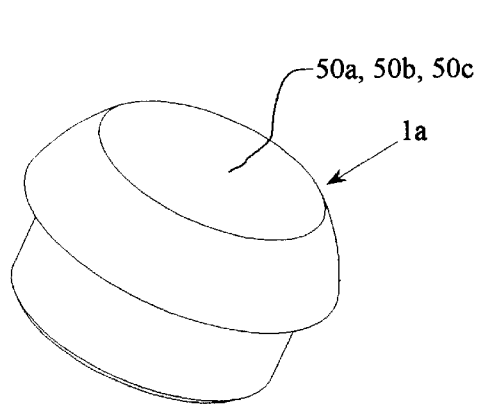
FIG. 3 is a detail of a hollow center crowned peg that allows a preload bolt to pass through it center.

The present invention provides a low cost alternative to prior methods. A quasi-kinematic coupling of the invention can readily use for example three conical grooves 35a, 35b, and 35c machined into a block and three crowned pegs pressed into a mating component. A crowned peg 1a, as shown in FIG. 3, can be inexpensively made as a semi-precision piece in a turning operation. Since conical grooves and press fit holes can be created by revolving tools, their placement is well suited, but not limited, to be aligned with features which are manufactured by revolving tools (i.e. drilled holes.) This allows the simultaneous machining of the conical grooves and additional features with a form tool 31 shown in FIG. 8. The form tool 31 can also be used in conjunction with pre-cast reliefs 22a and 22b, shown in FIG. 9, to form the joint seen in FIG. 10.

FIG. 3 and FIG. 4 show holes 50a and 49a in the kinematic elements through which bolts can pass. In addition, the joints should be located over features which form the largest triangle that will fit within the perimeter of the components. This is desired to provide maximum resistance to the torsion loads induced by the friction between the head(s) of the bolt(s) 12 and the surface of the component 2 which is bolted on.

As shown in FIG. 9, the pre-machined reliefs 22a and 22b can be economically manufactured by casting. This is permissible as the depth of the reliefs 22a and 22b need not be precisely located with respect to the mated surface 25. In addition, if the position of reliefs 22a, and 22b in the plane of the mated surface 25 is on the order of the capabilities of most the casting processes, it will not have a significant effect on the repeatability of the coupling.

Important design parameters of the quasi-kinematic joint of the invention will now be examined with reference to FIGS. 3, 4, 5, and 6. The two radii of the spherical member 1a, for example, the two radii of the corresponding conical groove 3a, the seat contact angle 59(a–d) (Φ), the depth of the conical groove 3a, the depth of the side reliefs 8a and 8b, and the materials used for the peg 1a and conical groove 3a are the most important parameters. With reference to FIG. 6, it has earlier been stated that quasi-kinematic couplings of the invention initially have a small gap 60 between the mating surfaces 25 and 26. This might, for example, be on the order of 0.10 mm, more or less. It is desired to choose the design parameters such that the gap 60 is not so large as to cause the surface of the spherical element such as 1a, to undergo plastic deformation during mating. If this is not avoided, the edges of the groove seats 62a, 62b, 62c, and 62d will leave indentations in the surface of the spherical element 1a, etc. This will adversely affect the repeatability of the coupling as during re-mating, the indentations will catch at random locations on the edges of the conical grooves 62a, 62b, 62c, and 62d. The result is an additional error in the location of the kinematic coupling which may not be correctable by additional preload. Choosing materials such that the spherical member 1a is harder than the conical groove 3a and optimizing the dimensions of the kinematic elements via finite element analysis are thus recommended.

Another important design consideration is the clamping force F. The clamping load and coefficient of friction should be chosen to provide an adequate friction force to resist all applied loads, even if the kinematic components were absent. In certain applications, a glue or sealing agent can be introduced between the mated components which will act to seal the interface or maintain joint position.

Transverse stiffness of the coupling is decoupled through the resistance to motion due to friction between the mating surfaces and the stiffness in the direction of mating is decoupled through the resistance to motion due to the clamping force and the contact of the mated surface.

In some applications where a kinematic joint is used coaxial with a tapped hole, an additional relief 45 may be required, as illustrated in FIG. 6. The deformation in the first threads 53 of the taped hole can cause deformation in the groove seats 63a and 63b. To avoid this, the threads 53 should start far enough from the seats 63a and 63b so that the deformation in the threads 53 does not affect the geometry of the seats 63a and 63b. If space is limited, finite element analysis is well suited to determine the minimum size of the relief needed to accomplish this.

Quasi kinematic couplings of the invention have many benefits over traditional kinematic couplings and other alignment methods, such as pinned joints, as earlier pointed out. They are less expensive to manufacture than many pinned joints since the kinematic elements require little precision machining and can be made with standard manufacturing processes. This, in conjunction with fewer components, make their use more economical and less complex than pinned joints. When comparing repeatability, a quasi-kinematic coupling constructed in accordance with the present invention, such as shown in FIG. 1, can attain 1 micron repeatability at a fraction of the cost of a pinned joint, which is typically only capable of five–ten micron repeatability. In addition, quasi-kinematic coupling joint placements are less sensitive to misalignment, since a spherical element, such as 1a, can easily fit into a conical hole 3a which is somewhat misaligned; then, through elastic/plastic deformation, make it conform during the initial mate. Increased clamping force F causes the surfaces 25 and 26 to touch without a loss of relative repeatability, thereby allowing the joint to be sealed. In comparison, the pinned joint method is intolerant and incapable of eliminating initial misalignment. Another benefit is that clamping the components together in a quasi-kinematic coupling, forces each spherical element into a conical groove, thereby inducing a centering effect which forces the mated components 2 and 4 into a best overall position. When using the pinned joint method, on the other hand, a centering effect does not occur.

In alternative embodiments, this coupling may also be used, as before stated, in the precision alignment of product components, parts to machine tool fixtures, machine tool fixtures to machines, casting molds and the like. In some applications, the three sets of mating conical grooves and spherical plugs are spaced to form a symmetrical equilateral or substantially equilateral triangle as in FIG. 1, for example; whereas in other applications, particularly where the structure of the mating components does not permit such symmetrical spacing, other and non-symmetrical spacing geometries may also be used. Other variations, modifications, and other implementations of what is described herein will also occur to those of ordinary skill in the art without departing from the spirit and the scope of the invention as claimed. Accordingly, the invention is to be defined not just by the preceding illustrative description, but instead by the spirit and scope of the following claims.

What is claimed is:

1. A method of quasi-kinematic coupling of two matable components with repeatable location alignment of their mating surfaces, that comprises, providing the mating surfaces with correspondingly disposed respective sets of three spaced grooves and corresponding mating protrusions, each of the grooves and protrusions being formed as surfaces of revolution; bringing the mating surfaces together to establish six lines of groove-protrusion contact, two lines of contact at each mating groove and protrusion, and with a small gap maintained between the two component mating surfaces; and clamping by forcing the components together to seat the protrusions in the grooves and seal the gap to effect the coupling with the two component mating surfaces in contact, and whereby said contact is dominantly established with high stiffness in a direction normal to each of the six contact lines, and low stiffness in the direction transverse to each of the six contact lines to yield in effect said quasi-kinematic coupling between them.

2. The method of claim 1 wherein the surface of revolution of the contracting grooves and protrusions are conical and spherical surfaces, respectively.

3. The method of claim 1 wherein the sets of grooves and protrusions are relatively elastically and plastically compliant to effect their seating and the resultant sealing of the gap with the two component mating surfaces brought into contact.

4. The method of claim 3 wherein, upon withdrawal of the force clamping the components together, the mating surfaces thereof resiliently separate.

5. A method of quasi-kinematic coupling of two matable components with repeatable location alignment of their mating surfaces, that comprises, providing the mating surfaces with correspondingly disposed respective sets of three spaced grooves and corresponding mating protrusions, each of the grooves and protrusions are formed as surfaces of revolution, bringing the mating surfaces together to establish six lines of groove-protrusion contact, two lines at each mating groove and protrusion, and with a small gap maintained between the two component mating surfaces; and clamping by forcing the components together to seat the protrusions in the grooves and seal the gap to effect the coupling with the two component mating surfaces in contact, wherein the grooves are provided with relief features to define the effective orientation of contact.

6. Apparatus for achieving quasi-kinematic coupling adapted for repeatable alignment having, in combination, two matable components having opposing surfaces which are to be aligned and mated in coupling; one component mating surface being provided with a set of three spaced grooves, and the other component mating surface being provided with a corresponding set of protrusions, with each of the grooves and protrusions being formed as surfaces of revolution, such that, when brought into contact, six lines of grooves-protrusion contact are established, two lines at each mating groove and protrusion, and with a small gap maintained between the two component mating surfaces; and means for clamping the components together to seat the protrusions at the grooves and seal the gap to effect the coupling with the two component mating surfaces in contact, and whereby said contact is dominantly established with high stiffness in a direction normal to each of the six contact lines, and low stiffness in the direction transverse to each of the six contact lines to yield in effect said quasi-kinematic coupling between them.

7. The apparatus of claim 6 wherein the surfaces of revolution of the contacting grooves and protrusions are conical and spherical surfaces of revolution, respectively.

8. The apparatus of claim 7 wherein the spherical surfaces are harder surface than the groove surfaces.

9. The apparatus of claim 7 wherein the sets of grooves and protrusions have a relatively elastically and plastically compliant to effect their seating and the resultant seating of the gap with the two component mating surfaces brought into contact.

10. The apparatus of claim 9 wherein, upon withdrawal of the clamping force clamping the components together, the mating surfaces thereof resiliently separate, and with said repeatable alignment.

11. A quasi-kinematic coupling adapted for repeatable alignment having, in combination, two matable components having opposing surfaces which are to be aligned and mated in coupling; one component mating surface is provided with a set of three spaced grooves, and the other component mating surface is provided with a corresponding set of protrusions; the grooves and protrusions are formed as surfaces of revolution, such that, when brought into contact, six lines of grooves-protrusion contact are established, two lines at each mating groove and protrusion, and with a small gap maintained between the two component mating surfaces; and means for clamping the components together to seat the protrusions at the grooves and seal the gap to effect the coupling with the two component mating surfaces in contact, wherein the surfaces of revolution of the contacting grooves and protrusions are conical and spherical surfaces of revolution, respectively, and wherein the conical grooves are provided with relief features to define the effective orientation of the contact.

12. The apparatus claimed in claim 7, wherein the spherical protrusions or the conical grooves are pressed into one component surface, and have hollow centers for receiving bolts or shafts.

13. The coupling as claimed in claim 11 wherein the conical groove relief features are cast in the component surface, and the contact surfaces are machined.

14. The apparatus claimed in claim 6 wherein the components are repeatably locatable with respect to each other, and with the application of a preload force, opposing surfaces of the components come into contact and form a face seal.

15. The apparatus of claim 7 wherein the transverse stiffness of the quasi-kinematic coupling is decoupled through the resistance to motion due to friction between the contact surfaces.

16. The apparatus of claim 7 wherein the stiffness of the coupling in the mated directions from the stiffness of the quasi-kinematic coupling is decoupled through the resistance to motion which exist due to the clamping force and the contact of the mated surfaces.

* * * * *